United States Patent [19]

Barr

[11] Patent Number: 4,763,357
[45] Date of Patent: Aug. 9, 1988

[54] METHOD AND APPARATUS FOR PROVIDING SECURE ELECTRONIC COMMUNICATIONS

[76] Inventor: William S. Barr, 249 Oak Beach Rd. #2249, Oak Beach, N.Y. 11702

[21] Appl. No.: 724,450

[22] Filed: Apr. 18, 1985

[51] Int. Cl.$^4$ ............................................. H04L 9/00
[52] U.S. Cl. ........................................ 380/48; 380/43; 380/44
[58] Field of Search ................... 375/2.1; 179/1.5 R; 364/200, 900; 178/22.13, 22.17; 380/43, 48, 44

[56] References Cited

U.S. PATENT DOCUMENTS

| | | | |
|---|---|---|---|
| 1,528,032 | 3/1925 | Staege . | |
| 1,598,673 | 9/1926 | Blackwell et al. . | |
| 1,635,156 | 7/1927 | Clement . | |
| 1,754,882 | 4/1930 | Clement . | |
| 2,298,562 | 10/1942 | Henroteau | 250/8 |
| 2,407,308 | 9/1946 | Lorenzen et al. | 179/1.5 |
| 3,534,264 | 10/1970 | Blasbalg et al. | 325/15 |
| 4,079,188 | 3/1978 | Kinch, Jr. et al. | 178/22 |
| 4,126,898 | 11/1978 | Spangler et al. | 364/900 |
| 4,149,035 | 4/1979 | Frutiger | 179/1.5 R |
| 4,158,236 | 6/1979 | Levy | 364/900 |
| 4,166,922 | 9/1979 | Kinch, Jr. et al. | 178/22.17 |
| 4,215,243 | 7/1980 | Maxwell | 364/200 |
| 4,221,931 | 9/1980 | Seiler | 179/1.5 R |
| 4,249,180 | 2/1981 | Eberle et al. | 375/2 |
| 4,267,592 | 5/1981 | Craiglow | 38/34 |
| 4,276,652 | 6/1981 | McCalmont et al. | 375/2.1 |
| 4,313,176 | 1/1982 | Cecil | 364/900 |
| 4,332,977 | 6/1982 | Safford | 178/22 |
| 4,390,947 | 6/1983 | DeShon | 364/200 |
| 4,425,664 | 1/1984 | Sherman et al. | 364/200 |
| 4,429,180 | 1/1984 | Unkenholz | 178/22.01 |
| 4,433,211 | 2/1984 | McCalmont et al. | 179/1.5 R |
| 4,440,976 | 4/1984 | Bocci et al. | 178/22.13 |
| 4,442,527 | 4/1984 | Munday | 380/34 |
| 4,601,043 | 7/1986 | Hardt et al. | 375/1.0 |

OTHER PUBLICATIONS

Hayes, Smartmodem (2400) User's Guide, (1985).
"Spread Spectrum Systems" by Robert C. Dixon, 2nd Edition, 1984.

Primary Examiner—Salvatore Cangialosi
Assistant Examiner—Aaron J. Lewis
Attorney, Agent, or Firm—Kenyon & Kenyon

[57] ABSTRACT

A method and apparatus for providing secure electronic communications over a communications medium between first and second locations is disclosed. A data device for generating and/or receiving data is located at each of the locations. A composite modem is coupled to each data device. Each composite modem comprises a microprocessor controller operating under program control for determining the configuration of the message to be transmitted from one data device to the other. The controller is coupled to a switching circuit which selects, in dependence on a configuration message generated by the controller, the configuration of the message to be transmitted. A plurality of characteristic controllers are coupled to the switching circuit. Each characteristic controller is provided to select at least one variation of one of a plurality of characteristics of the message, including the baud rate, transmission coding scheme, transmission method, parity technique, transmission technique (full or half duplex), carrier frequency and modulation technique. The configuration message is also transmitted to the second location so that the second location can be properly configured to receive the message. At time intervals, preferably random time intervals, the configuration message is changed. The configuration message itself is also preferably generated randomly. The configuration message can be changed as often as necessary to prevent unauthorized access to the information transmitted over the communications channel.

36 Claims, 4 Drawing Sheets

METHOD AND APPARATUS FOR PROVIDING SECURE ELECTRONIC COMMUNICATIONS

BACKGROUND OF THE INVENTION

The present invention relates to the field of electronic communications and more particularly, to the field of providing secure electronic communications over a communications channel. The present invention processes electronically transmitted messages in a manner such that an extremely low probability of unauthorized interception is assured. The present invention has application to the protection of data stored in memory banks of computer systems, such that the data stored therein cannot be intercepted so as to provide information to unauthorized persons. The present invention provides a method and apparatus for maintaining the security of the transmitted message itself rather than merely acting as a port protection device, because the method and apparatus of the present invention prevents unauthorized interception and data reception at any point along the transmission path.

The present invention may be used with a large number of information transmission systems, whether the communications channel is a wire (dedicated as well as standard telephone line), or wireless (radio or microwave and of any modulation technique, for example, AM, FM or phase modulation). The present invention also has application to communications channels wherein fiber optic links provide the transmission medium. The present invention may be used for point to point transmission and also for network transmission, for example, in local and wide area networks.

SUMMARY OF THE INVENTION

Unlike other methods that superimpose an artificially generated, potentially breakable coding scheme upon the message itself, this invention is based upon the fact that for information transfer to be successful, the values and types of the components and transmission and reception protocols at both the transmitting and receiving ends of a data transmission system must be substantially the same. For example, if one or more of the characteristics at one end of the transmission system is changed, the characteristic at the other end must also be changed in order for successful reception to be accomplished.

When the number of possible variations is large enough and the rate of change of the variations is fast enough, the probability of unauthorized interception is extremely low.

The present invention controls transmission between first and second data devices, for example, a central computer and a computer terminal, whether the computer terminal is an intelligent or dumb terminal or another CPU, and insures the integrity of the data transmission by varying the characteristics of the signal transmitted over the communications channel. The characteristics of the communications channel are varied by selecting, from amongst a plurality of data transmission protocols, the particular transmission protocol to be used at any one time. At intervals, for example, at random intervals, the transmission protocol is changed, thereby preventing an unauthorized person from intercepting the data transmitted over the communications channel in an informative way, since the intercepting party would have to be able to change the characteristics of the receiver to match the transmitter. If the characteristics are changed randomly and at random time intervals, this will present a formidable task.

The characteristics of the transmitted data which may be varied by the present invention include, in an embodiment suitable for providing secure data transmission over analog channels, e.g., telephone lines, the transmission speed or baud rate, the transmission carrier frequency, the transmission coding scheme (for example, ASCII or EBCDIC), the transmission technique (for example, half duplex or full duplex), the transmission method (for example, asynchronous (START-STOP), or synchronous (BISYNC OR HDLC), the modulation technique (for example, AM, FSK, PM or QAM) and the parity technique (for example, vertical parity, horizontal parity). Additionally, other characteristics could also be changed. The above characteristics may be varied separately or in combination. The characteristics may be varied continually and preferably are varied in a completely random manner. Complete synchronization between the sending and receiving units during the transmission process is provided. The characteristics of the transmitted data are variable over a wide range so that the system of the present invention can be adjusted to meet the requirements of substantially all carrier media. Each of the characteristics of the transmitted data are varied by selecting a different characteristic provided by each component of a composite modulator/demodulator (modem) coupled to the data device transmitting data. Similarly, at the receiver, the components of a composite modulator/demodulator are changed so as to match the transmitter in time. The number of components of the system which can be varied is dictated directly by market requirements for degree of security and cost. If the requirement for security is very high, the number of components will be increased to the level where the number of possible transmission configurations will be of such sufficient magnitude to make the probability of interception extremely low. The resulting cost of the device will, accordingly, be high. If, on the other hand, security requirements are lower, fewer components will be required and the number of possible configurations will be lower. The cost will be less but the probability of possible interception will increase.

The present invention can be used as a standalone device that operates independently of sender or receiver and at any distance between sender and receiver. Furthermore, the present invention can be provided as a separate external device to be coupled into a computer system or it can be provided as module to be plugged internally into a card location in a computer.

It is an object of the present invention to provide a method and apparatus for providing secure electronic communications over a transmission channel.

It is a further object of the present invention to provide a method and apparatus for providing secure electronic communications over a variety of transmission channels.

It is yet a further object of the present invention to provide a method and apparatus for securing electronic communications from unauthorized interception by varying the transmission characteristics of the transmitted data. Thus, if an unauthorized party obtains access to the transmission channel, he will not be able to intercept the data so as to understand its contents unless he is equipped with a receiving unit capable of changing its configuration in synchronism with the transmitted data. Only authorized persons will have such a receiving unit, and the present invention provides means to guard against theft by changing the transmitting configuration program, thereby making a stolen receiving unit useless.

It is still another object of the present invention to provide a method and apparatus for providing secure electronic communications by varying the baud rate of the transmitted data.

It is yet another object of the present invention to provide a method and apparatus for providing secure electronic communications between data devices over telephone lines.

It is yet another object of the present invention to provide an apparatus for providing secure electronic communications which utilizes a microprocessor controlled modulator/demodulator means for varying the characteristics of transmitted and received electronic data.

These and other objects of the present invention are achieved by apparatus adapted to be coupled to each end of a communications system for providing secure electronic communications between electronic data devices located at respective ends of the system comprising means for providing a plurality of characteristics to an information message signal containing an information message generated by one of the data devices for transmission to the other data device over a communications channel of the communications system, control means coupled to the data device for determining the configuration of the information message signal to be transmitted over the communications channel, and switching means coupled to the data device, the control means and to the means for providing for selecting at least one variation of each of the plurality of characteristics, the switching means being responsive to a configuration message generated by the control means.

In a preferred embodiment, the plurality of characteristics comprise at least the baud rate of the message signal selected from a plurality of baud rates, the modulation technique selected from a plurality of modulation techniques, and the frequency of the carrier of the message signal selected from a plurality of carrier frequencies.

Also encompassed within the scope of the invention is a method for providing secure electronic communication over a communications channel, as will be described herein.

The apparatus of the present invention preferably randomly selects, without discernible pattern, from amongst a group of characteristics, each characteristic controlled by a component of the system, at least one variation of each of the characteristics necessary for data transmission. A change will be made from one configuration to another configuration rapidly and preferably at frequent random time intervals.

A microprocessor controller at the transmitting location determines the particular transmission configuration to be used during a particular transmission time period and transmits a configuration message defining that configuration to a microprocessor controller at the receiving end. The transmitting unit simultaneously changes its own configuration to match the definition it has generated. If the subsequent transmission from the receiving end does not match the configuration of the transmitting unit, the transmitting unit will interrupt and retransmit the configuration message. It will repeat this process a predetermined number of times, but if no matching data is received, it will disconnect.

If the transmission is successful, the transmitting unit will determine the time duration for that particular configuration. When that time period is at an end, the transmitting unit will signal an interrupt and transmit a new configuration message defining a different configuration, and the process will be repeated until all the data defining the communication has been transmitted. The duration of a particular configuration can be as long or as short as security requirements demand and can vary at random from one period to the next. An apparatus in accordance with the invention is required at each end of the communications system and preferably replaces the standard communications modems provided for data transmission over, for example, telephone lines.

In one embodiment, only the microprocessor controller located at one end of the system, referred to herein as the host, contains a program that determines the message and component configuration and the timing pattern, but both the host and the microprocessor controller located at the other end contain the same switching circuits and identical circuitry for selecting the various characteristics of the data to be transmitted. In another embodiment, both microprocessor controllers at both ends of the system are the same, and, depending upon which controller is the transmitting unit, implement a program for providing secure communications which configures the transmitting unit (which can be the device at either end) and also informs the receiving unit of the new configuration.

Since it is possible to include enough variations in the apparatus of the present invention for the number of possible configurations to exceed several million, probability of interception can be made very low. The probability of unauthorized interception is inversely proportional to the number of characteristics available and the rapidity with which the configurations are changed.

BRIEF DESCRIPTION OF THE DRAWINGS

The present invention will be described in greater detail in the following detailed description with reference to the drawings in which.

DETAILED DESCRIPTION

Figure 1:
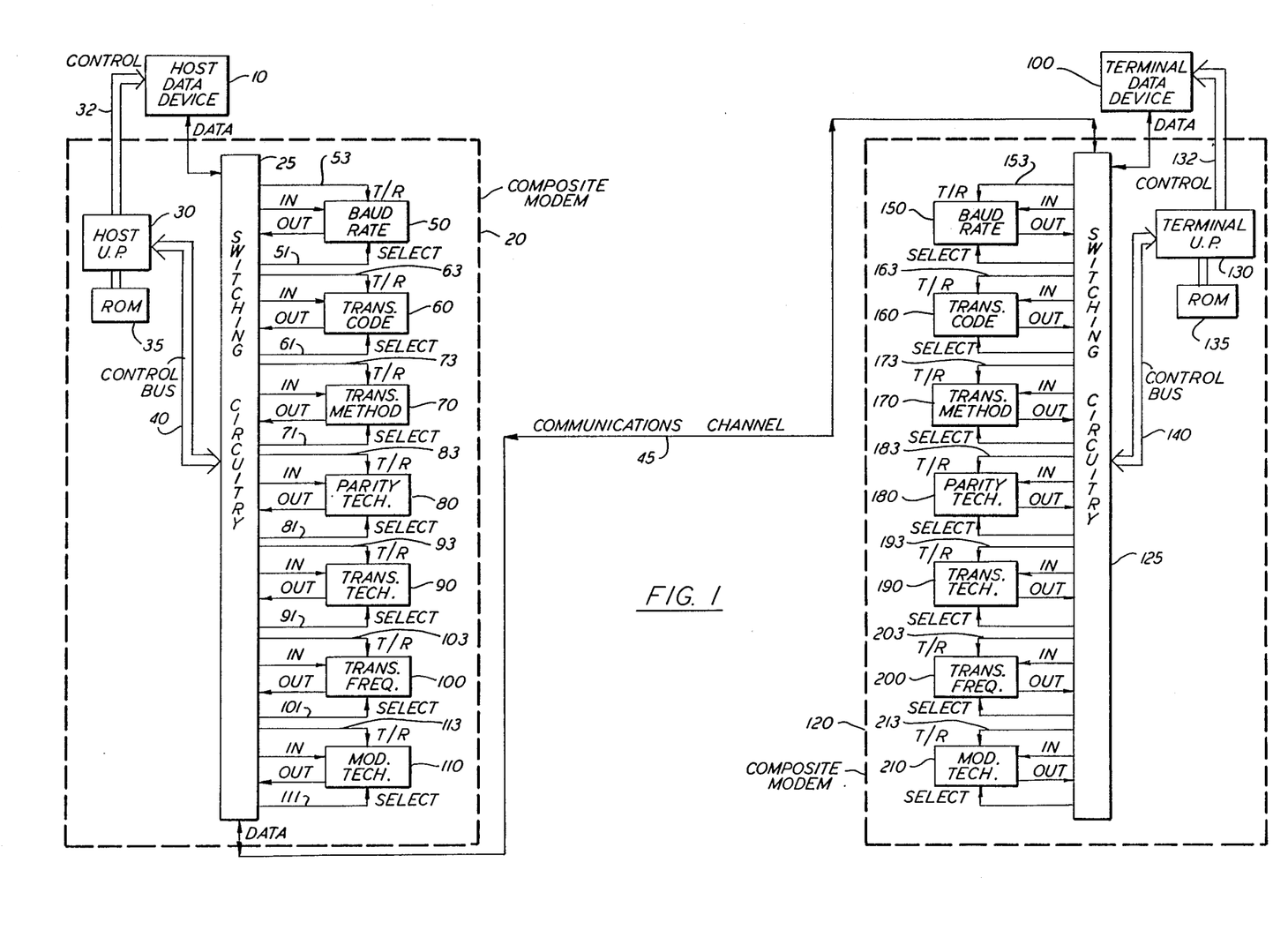
FIG. 1 is a block diagram of apparatus in accordance with the invention.

With reference now to the drawings, FIG. 1 shows a block diagram of one embodiment of apparatus in accordance with the present invention. A data device 10, located at a first end of the transmission system and for the purposes of this description, which will be denoted the host data device, transmits its data to a device 20. Device 20 is denoted a composite modem in FIG. 1 because the communications channel is typically an analog telephone line, which requires means to convert digital data into analog format, i.e., to modulate the data on a carrier signal. Of course, however, if a digital communications channel is utilized, the digital data would not require modulation and corresponding demodulation at the receiver end.

The digital data is transmitted to switching circuitry 25 contained within the composite modem. The composite modem 20 also comprises a host microprocessor 30, and read-only-memory 35 having stored therein a program which determines the transmission characteristics of the data to be transmitted over the communications channel 45, preferably randomly via a random number generator program. Additionally, read-only-memory 35 may contain a random number generator program which randomly generates time intervals during which a particular transmission configuration is used. The host microprocessor 30 is coupled via a control bus 40 to switching circuitry 25. The configuration message which defines the particular configuration of the transmitted message is communicated to switching circuitry 25 via control bus 40. Bus 32 coupling data device 10 and microprocessor 30 allows microprocessor 30 to signal data device 10 at the appropriate times to transmit data to switching circuitry 25. Switching circuitry 25 is coupled to a plurality of transmission/reception characteristic controllers 50, 60, 70, 80, 90, 100 and 110. These controllers allow the selection of a particular variation of a characteristic, e.g., if the characteristic is the modulation technique, then FM, AM, PM or QAM modulation can be selected, for example. Switching circuitry 25, in dependence upon the configuration message on control bus 40 from microprocessor 30, generates signals along select lines 51, 61, 71, 81, 91, 101, and 111. Each select line may comprise a plurality of lines, depending on the number of bits necessary to select a particular variation of a characteristic. Additionally, switching circuitry 25 generates a signal on lines 53, 63, 73, 83, 93, 103, and 113, which signal controls the mode of operation, i.e., whether data is being transmitted from the host data device 10 or received by the host data device 10. The control signals on lines 53, 63, 73, 83, 93, 103 and 113 determine whether the respective characteristic controller 50 to 110, for example, decodes or translates data that is received or determines the characteristics of data to be transmitted.

Characteristic controller 50 comprises a baud rate generator, and controls the speed at which data is transmitted or received over the communications channel. At the present time, for purposes of industry standardization and uniformity, common transmission speeds over voice grade dial-up telephone lines have been arrived at by convention, and are usually represented by discrete values of bps (bits per second). Typically, commercial modems operate at speeds of 300, 1200, 2400, 4800, 9600 or 14400 bps. For the most part, low speed modems transmit up to 1200 bps, medium speed modems up to 2400 bps and high speed modems up to 9600 or 14400 bps. There now exists the capability of transmitting up to 14400 bps over 3200 Hz narrow bandwidth telephone lines. Speeds faster than 14400 bps are available on wide band networks usually using 4 wire lines, either dedicated or dual dial. Much wider bandwidths are available for radio and fiber optic transmissions, and thus much higher transmission speeds are possible.

Table 1 shows one example of the transmission speeds which can be selected by the embodiment of the invention shown in FIG. 1. Accordingly, baud rate generator 50 selects transmission speeds varying between 1000 bps and 4050 bps in increments of 50 bps. Switching circuitry 25 selects the appropriate transmission speed, as determined by the configuration message from host microprocessor 30 transmitted to switching circuitry 25 via control bus 40. Typically, the microprocessor clock is divided by a number entered by a program. The quotient is the new transmission speed and can theoretically be any value, integer or fractional, between 1 and 19200 bps. As a practical matter, limits are imposed on the transmission speeds by the characteristics of the transmission medium in terms of available bandwidth. This restriction is overcome by suitable coding and increases the number of bits per baud, allowing the bps rate to exceed the telephone line bandwidth and nominal baud rate (typically about 3000 baud for telephone lines). In the present invention, the transmission speed value for each successive time interval is calculated, under program control, to be set such that the new speed will be far enough from the old speed to prevent interception by a receiver that has not changed its reception characteristic to match. Additionally, the transmission speed is also monitored to allow for restrictions imposed by the bandwidth of the transmitting medium.

TABLE 1

| | Trans. Speed | | |
|---|---|---|---|
| A. | 1000 bps | N. | 1650 |
| B. | 1050 | O. | 1700 |
| C. | 1100 | P. | 1750 |
| D. | 1150 | Q. | 1800 |
| E. | 1200 | R. | 1850 |
| F. | 1250 | S. | 1900 |
| G. | 1300 | T. | 1950 |
| H. | 1350 | U. | 2000 |
| I. | 1400 | V. | 2050 |
| J. | 1450 | W. | 3000 |
| K. | 1500 | X. | 3050 |
| L. | 1550 | Y. | 4000 |
| M. | 1600 | Z. | 4050 |

As shown in FIG. 1, data from data device 10 is input to switching circuitry 25. The data may be transmitted to the baud rate generator 50 wherein the transmission rate of the data is changed from its original rate from device 10 to its new rate. The input data is present on the line "in" and the data having the new rate is present on the line indicated as "out". The speed of the data from the data device 10 is generally much higher than the speed of the data transmitted over the communications channel, and accordingly, suitable control signals for interrupting data flow and buffer memories are necessary in order to store data as the rate is being reduced. These control signals are provided to the data device from controller 30 over bus 32.

Transmission code controller 60 establishes the coding scheme for the data from data device 10. For example, it may select between ASCII and EBCDIC transmission codes as shown in Table 2, or other known coding schemes. Selection between coding schemes is done via line 61. Line 63 determines whether the data is being transmitted or received, and accordingly, whether the message is being coded for transmission or decoded for reception.

TABLE 2

| Trans. Code |
|---|
| A. ASCII |

TABLE 2-continued

| Trans. Code |
| --- |
| B. EBCDIC |
| C. Other |

Characteristic controller 70 comprises a means for selecting the transmission method, i.e., whether asynchronous or synchronous. For example, the standard asynchronous START/STOP type protocol may be used or such synchronous protocols as BISYNC or SDLC (Synchronous Data Link Control), as shown in Table 3. Selection of the transmission method is performed via line 71 from switching circuitry 25.

TABLE 3

| Trans. Meth. |
| --- |
| A. ASYNCHRONOUS |
| B. SYNCHRONOUS-BISYNC |
| C. SYNCHRONOUS-SDLC |

Characteristic controller 80 comprises a means for selecting the parity technique. For example, either vertical or horizontal parity techniques may be used, as shown, for example, in Table 4.

TABLE 4

| Parity Technique |
| --- |
| A. Vertical |
| B. Horizontal-LRC (Longitudinal Redundancy Check) |
| C. Horizontal-CRC (Cyclic Redundancy Check) |
| D. Horizontal-Trellis Coding |

Characteristic controller 90 comprises a means for selecting the transmission technique, i.e., whether half-duplex or full-duplex. Three different transmission techniques are shown in Table 5.

TABLE 5

| Trans. Tech. |
| --- |
| A. Half-Duplex |
| B. Full-Duplex-Firstband Send Secondband Receive |
| C. Full-Duplex-Firstband Receive Secondband Send |

Characteristic controller 100 comprises means for selecting the center frequency of the carrier signal transmitted on the communications channel. The carrier frequency is selected via select line 101, and the frequency may, for example, be selected in the range from 1000 Hz to 2500 Hz, in increments of 100 hz, as shown in Table 6. Smaller increments can also be chosen, thereby increasing the number of possible configurations even further. The limiting factor for transmission speeds over voice grade telephone lines is the availability of a bandwidth of only approximately 3200 Hz. Recent echo cancelling technology, the development of fixed and automatic adaptive equalizers, and other devices, new modulation techniques and transmission codes and methods have allowed the use of transmission speeds of up to 14400 bps over the vast network of available telephone lines. Furthermore, if the band width of the channel is greater, additional frequencies can be used, thereby increasing the number of configurations even more. The transmission frequencies utilized will vary depending upon the type of transmission technique used. For example, if half-duplex is used, the same transmission frequency will be used by both the composite modem at the host end of the system and by the composite modem at the terminal end of the system. If full-duplex duplex FSK transmission is utilized, then the host might transmit at one frequency and the terminal device at another. For example, the host might transmit at a center frequency of 1200 Hz (0=1070 Hz, 1=1270 Hz) and the terminal device at a center frequency of approximately 2200 Hz (0=2025 Hz, 1=2225 Hz).

TABLE 6

| Trans. Freq. | | | |
| --- | --- | --- | --- |
| A. | 1000 Hz | I. | 1800 |
| B. | 1100 | J. | 1900 |
| C. | 1200 | K. | 2000 |
| D. | 1300 | L. | 2100 |
| E. | 1400 | M. | 2200 |
| F. | 1500 | N. | 2300 |
| G. | 1600 | O. | 2400 |
| H. | 1700 | P. | 2500 |

The development of digitally controlled phase locked loops (PLL'S) containing voltage controlled oscillators (VCO'S) and using frequency divider networks has resulted in the ability to vary and control transmitting and receiving frequencies rapidly and accurately. Accordingly, in a preferred embodiment of the present invention characteristic controller 100 comprises a phase locked loop for each transmission frequency or a single phase locked loop whose frequency of operation can be varied by a suitable control circuit. The use of phase locked loops allows accurate control of transmitted frequencies and accurate synchronization or locking to received frequencies.

The number of frequency bands used according to the present invention is directly proportional to market requirements for degree of security and cost. It is possible to provide sufficient circuits that will generate frequencies that differ from each other by as little as 1 Hz across the entire available spectrum. In the preferred embodiment of the invention, transmission frequencies varying by 10%, i.e., by 100 Hz, as shown in Table 6, are used.

Characteristic controller 110 comprises means for varying the modulation technique. If the communications channel is a telephone line, one of a number of analog modulation techniques can be used. The modulation technique is selected by line 111 from switching circuitry 25. Suitable modulation techniques include amplitude modulation (AM), frequency modulation (FM) or frequency shift keying (FSK), phase modulation (PM) or quadrature amplitude modulation (QAM). The use of digitally controlled phase locked loop circuits enables the apparatus of the present invention to switch rapidly and accurately from one modulation technique to another.

TABLE 7

| Modulation Technique |
| --- |
| A. AM |
| B. FSK (FM) |
| C. PM |
| D. QAM |

Although details of the switching circuitry 25 and the various characteristic controllers 50, 60, 70, 80, 90, 100 and 110 are not shown, it will be readily apparent to a person of skill in the art how such circuitry for accomplishing the indicated functions can be provided. The present state of the art of integrated circuitry has also provided the ability to incorporate and use under programmed control, each of the functions required to be performed by the individual controllers 50, 60, 70, 80, 90, 100 and 110 and that of switching circuitry 25. For example, the indicated functions can be performed by circuitry provided on large scale integrated (LSI) chips and on medium scale integrated (MSI) chips.

At the other end of the transmission system, a data device 100, indicated in FIG. 1 as the terminal data device, is provided. Terminal data device 100 can receive data or can transmit data to the host data device 10. A composite modem 120 is provided at the terminal end of the transmission system. The composite modem 120 includes the same components as composite modem 20 at the host end of the system. Accordingly, composite modem 120 comprises terminal microprocessor 130, a control bus 140, data device 100 coupled to microprocessor 130 via data control bus 132, switching circuitry 125 and characteristic controllers 150, 160, 170, 180, 190, 200 and 210. Each characteristic controller performs the same function as its counterpart in the host composite modem 20. The various transmit, receive lines 153, 163, 173, 183, 193, 203 and 213 are provided to indicate the mode of operation. For example, if composite modem 20 at the host end of the system is transmitting data to the composite modem 120 at the terminal end of the system, the lines 153 to 213 will be in the receive mode. This indicates, for example, that controller 210 must demodulate the signal according to the required demodulation technique. For example, if FSK is being utilized, a frequency demodulation technique must be employed. Similarly, if the transmission method is asynchronous, transmission method controller 170 will be configured so as to receive asynchronous data.

The operating system for each device at the host and terminal ends of the system is contained in a read-only-memory chip 35 or 135, respectively. Preferably, the ROMS are manufactured as plug-in modules and in a set. Each set is different from other sets in that they contain different configuration message definitions and program instructions and sequences.

If the system is configured for the one way transmission of data from host to terminal only, then the read-only-memory 35 coupled to the host microprocessor 30 contains instructions necessary to:

1. Identify the particular components, i.e., characteristic contollers, contained at the terminal end of the system;

2. Randomly select the component configuration and baud rate divisor to be used for a particular transmission time segment and generate a configuration message word corresponding thereto;

3. Switch to the selected configuration itself;

4. Determine the length of a particular transmission time segment, either at random or by operator intervention;

5. Generate and interrupt and transmit all configuration information to the terminal; and 6. Determine the necessity for and the implementation of disconnect procedures.

At the terminal end of the system, the read-only-memory 135 contains the instructions necessary at least to:

1. Signal the host that it is ready to transmit;

2. Transmit to the host the message defining its component configuration capability; and 3. Switch to the new component configuration as defined by the host.

Additionally, the read-only-memory 135 may also contain the instructions necessary to perform all of those functions which the host can perform, in which case the host messages transmitted from the composite modem 120.

The block diagram of FIG. 1 discussed shows an embodiment of the invention which provides for two way secure communications between data devices 10 and 100. As discussed, however, the system could equally be applied to a one way communications system.

Figure 2:
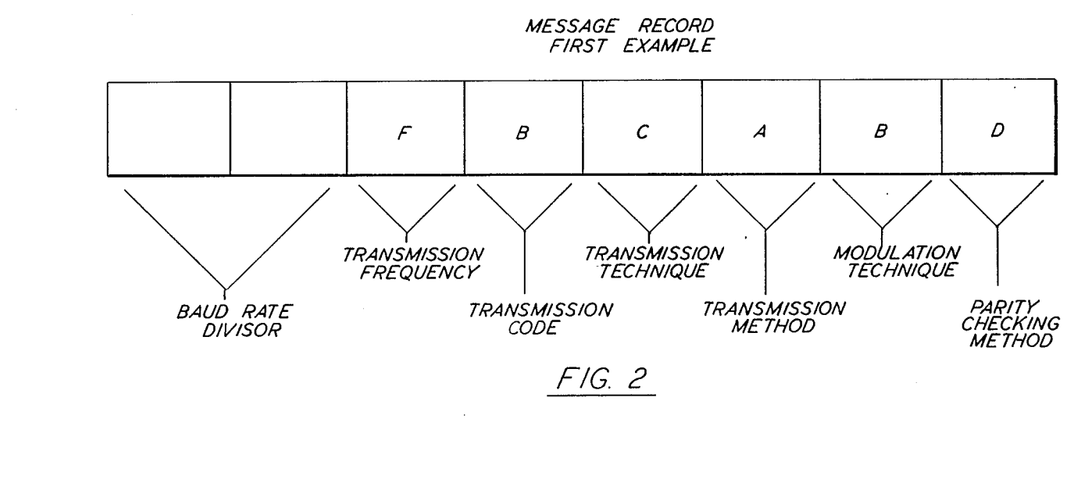
FIG. 2 shows one example of a configuration message for configuring the transmitter and transmitted over the communications channel of FIG. 1 for configuring the receiver.

FIG. 2 illustrates one possible configuration message which is transmitted from host composite modem 20 to terminal composite modem 120 to identify the configuration to which composite modems 20 and 120 must switch. As shown, the configuration message comprises eight bytes of information. The first two bytes identify the baud rate divisor. Each byte comprises four bits and can identify sixteen different variations. Accordingly, at least five bits would be necessary to identify the twenty-six different transmission speeds shown in Table 1. The third byte identifies the transmission carrier center frequency. In this instance, a transmission carrier center frequency of 1500 Hz is selected. The fourth byte identifies the transmission code. In this instance, the EBCDIC code has been selected. The fifth byte identifies the transmission technique. In this instance, full-duplex first band receive, second-band send has been selected. The sixth byte identifies the transmission method. In this case, the transmission method is asynchronous. The seventh byte identifies the modulation technique, in this case FSK. The eighth byte identifies the parity checking method, in this case, trellis coding.

Figure 3:
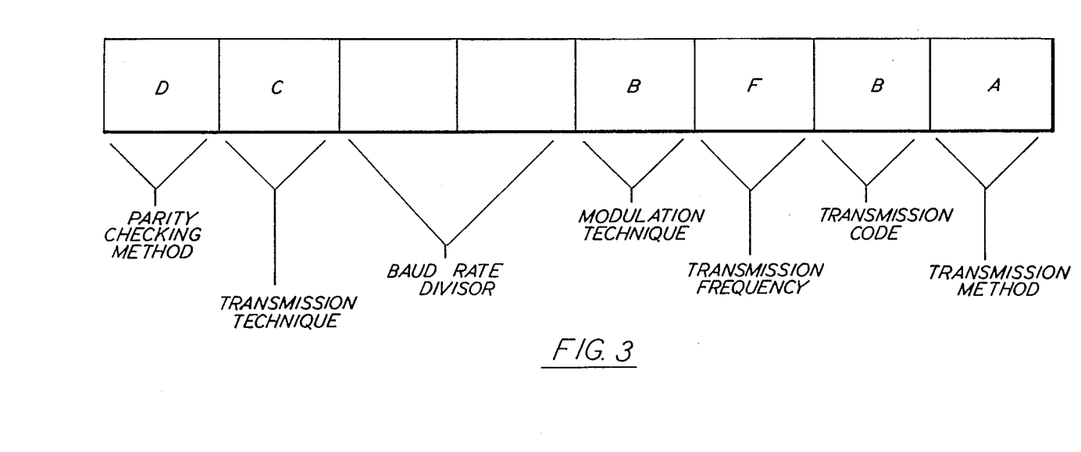
FIG. 3 shows another example of a configuration message.
Figure 4:
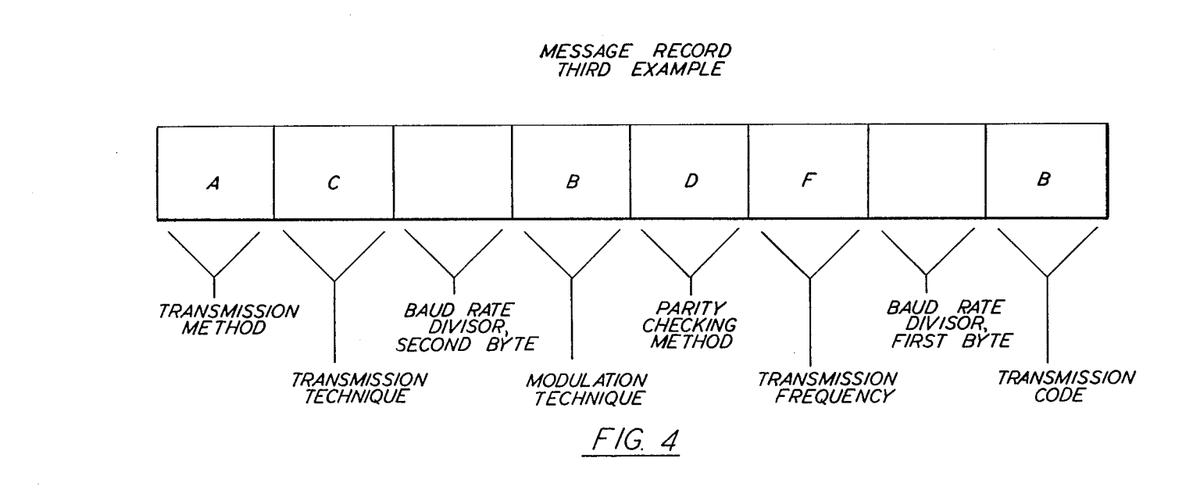
FIG. 4 shows yet another example of a configuration message.
Figure 5:
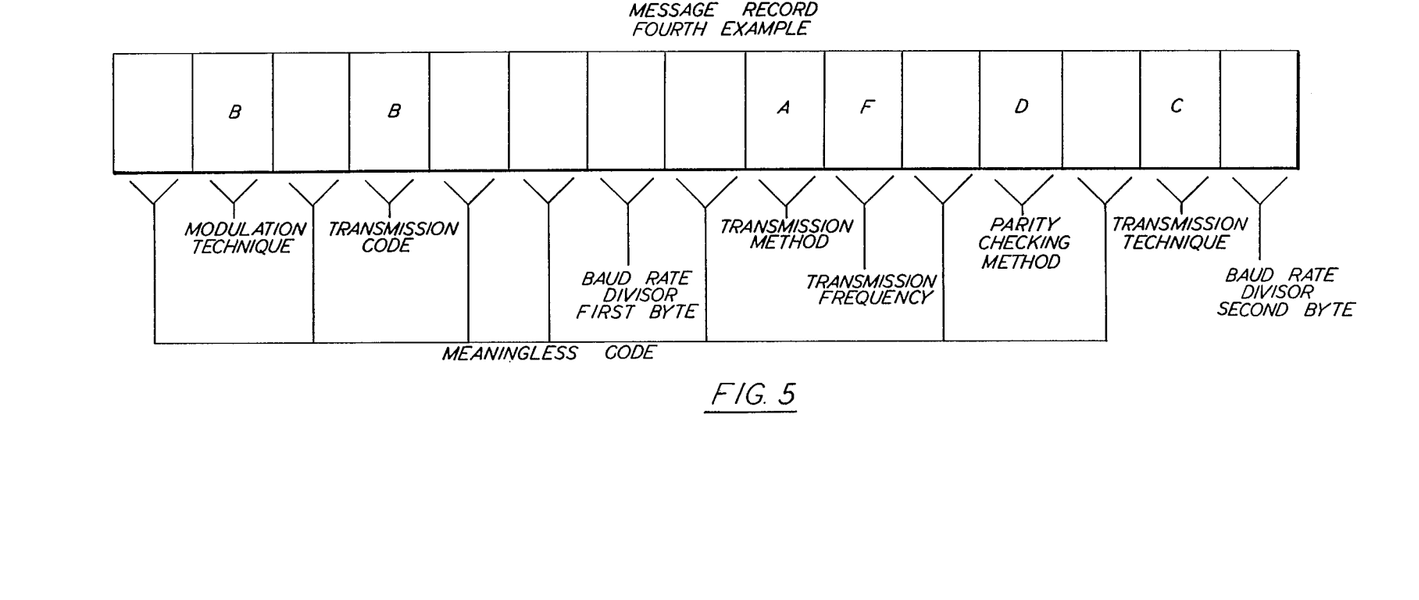
FIG 5 shows yet another example of a configuration message for configuring the apparatus of the present invention.

ROM module 35 is preprogrammed to select the order in which the various characteristics appear in the control message, the order preferably being random. ROM 135 at the terminal end is provided with a program which is synchronized when ROM 35 changes its configuration to a new configuration and the new configuration is transmitted to composite modem 120, ROM 135 at the terminal end automatically changes its configuration so that it matches the configuration of ROM 35. The order in which the characteristics appear in a configuration message varies each time that the configuration message is generated, therefore, providing additional system security. Accordingly, not only is the particular characteristic changed each time, for example, the transmission code is changed from EBCDIC to ASCII, but also, the particular byte in the configuration message may signify a different characteristic from the previous configuration message. Thus, for example, as shown in FIGS. 3 and 4, the second configuration message may have the format as shown in FIG. 3. The fourth configuration message may have a different format, as shown in FIG. 4. Further, the configuration message may have additional bytes which are provided so as to confuse any possible intercepting device, as only certain ones of the bytes contain information necessary for the proper reception of the transmitted message. The remaining bytes contain meaningless code, but are ignored by the terminal microprocessor 130.

Since it is quite possible, and even probable, that a host or terminal unit will be stolen, thus allowing unauthorized access, the programs that control generation and translation of the instructions are prepared in unique sets of "plug-in" read-only-memory ROM modules that are easily replaceable. Accordingly, if a module is stolen, a new set of ROM modules can be plugged in the respective host and terminal composite modems, thus implementing new configuration instructions. Each set of plug-in ROM program modules contains the unique instructions for generating and translating the positional information for the particular unique set of devices. A module from one set cannot be used with the module from another set. Although in FIGS. 2, 3, 4 and 5 the same characteristics are shown as having been selected, different characteristics preferably are selected by each configuration message as desired, to increase system security.

When the system is first powered up, the system starts with an initial transmission configuration. The system normally returns to this configuration upon transmission sign off, and the system start-up configuration is preferably always the same and determined upon manufacture for every group of devices.

Upon dial-up, or after other connection is made, the terminal transmits a message indicating its readiness to transmit and that includes a definition of its component capability. The host generates a character string that allows for the component capabilities of the terminal. The host program also controls and matches the transmission characteristics to the capacity and capability of the available transmission medium. If the subsequent transmission from the terminal does not indicate a component match, the host will interrupt and retransmit the configuration message. It will repeat this process a predetermined number of times and then, if not successful, disconnect. If successful, thereafter, at host controlled intervals, whose frequency and duration are varied either at fixed intervals or randomly as set by program in ROM 35, and/or at fixed intervals or randomly as set by operator intervention, the host device again signals an interrupt, generates a new word defining a new and different configuration and retransmits the message to the terminal. The length of time necessary to switch from one configuration to another is measured in microseconds. The interval between changes in characteristics can therefore be very small. The probability of unauthorized intervention, interception and/or invasion, approaches an extremely small number as the number of components increases and the duration interval decreases.

In the embodiment illustrated by FIG. 1 having the ability to vary characteristics as shown by Tables 1 through 7, 149,760 possible configurations are available. It would take any monitoring device a large amount of time to determine the value and/or state of all the components involved. In the case of attempted unauthorized invasion or intervention, the host device is programmed to disconnect if the proper return message does not match the signal configuration after a short time. The short time can be varied and determined by the degree of security required, either under program control or manually.

In the case of attempted unauthorized interception, a significant percentage of the transmitted message will be lost during the time used by the intercepting monitoring and locking in process. The percentage message loss is directly proportional to the number of components in the composite modems, and inversely proportional to the length of the duration interval.

Figure 6:
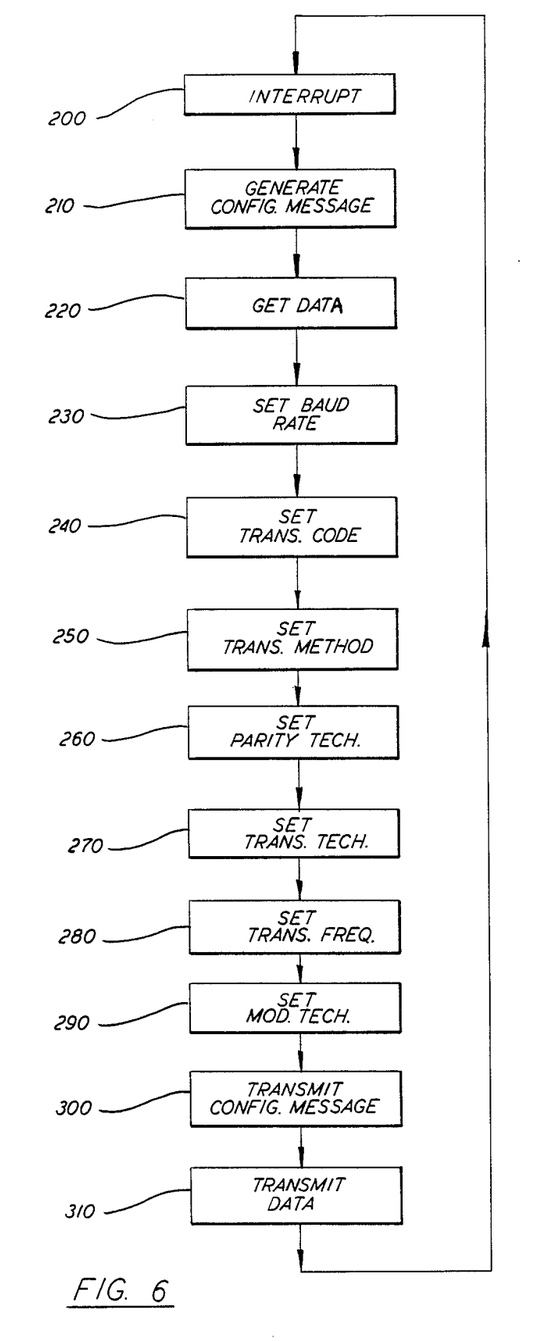
FIG. 6 is a flowchart showing how the transmitting unit configures itself in response to a configuration message from the controller.

FIG. 6 is a flowchart illustrating how the transmitting unit configures itself and transmits both a configuration message and data to the receiving unit. As shown, microprocessor 30 first generates an interrupt 200. A new configuration message is generated by the microprocessor 30 under control of a program in ROM 35, as shown at 210. Data is then retrieved from the data device 10 by appropriate signalling from microprocessor 30 via bus 32, as shown at 220. The baud rate divisor is first set as shown at 230, followed by the transmission code at 240, transmission method at 250, parity technique at 260, transmission technique at 270, transmission frequency at 280 and modulation technique at 290. The configuration message is then transmitted at 300 to the receiving unit. The configuration message itself is transmitted using the same protocol as the transmitted information data. Finally, at 310, the information data is transmitted to the receiving end. When the next interrupt occurs, data transmission stops and a new configuration message is generated at 210. The process then continues with the new configuration.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than restrictive sense.

What is claimed is:

1. Apparatus coupling to each end of a communications system providing secure electronic communications between digital electronic data devices located at respective ends of the system comprising:

means for providing a plurality of characteristics to an information message signal containing an information message generated by one of the data devices for transmission to the other data device over a communications channel of the communications system, said plurality of characteristics comprising at least the baud rate of the information message signal selected from a plurality of baud rates, the modulation technique selected from a plurality of modulation techniques and the frequency of the carrier of the information message signal selected from a plurality of carrier frequencies;

control means coupled to the data device for automatically and randomly determining a configuration of the information message signal to be transmitted over the communications channel, thereby allowing the random selection of the characteristics of said information message signal, said configuration comprising a selection of at least one variation of each of said plurality of characteristics, said configuration being defined by a configuration message which changes at random times, thereby changing said configuration at the random times; and switching means coupled to said data device, said control means and to said means for providing for selecting at least one variation of each of said plurality of characteristics, said switching means being responsive to the configuration message defining said configuration generated by said control means.

2. The apparatus recited in claim 1, wherein said control means comprises microprocessor means for changing the configuration of the information message signal to be transmitted at time intervals determined by a program stored in memory means of said control means.

3. The apparatus recited in claim 2, wherein said microprocessor means comprises means for changing the configuration of the information message signal to be transmitted at random time intervals.

4. The apparatus recited in claim 1, wherein said control means comprises means for generating said configuration message, and said switching means comprises means responsive to said configuration message for selecting the characteristics of the information message signal to be transmitted over the communications channel and for transmitting said configuration message to the other end of the communications system over the communications channel for configuring apparatus at the other end of the system so as to enable reception of the information message signal.

5. The apparatus recited in claim 4, wherein said configuration message comprises a message transmitted during intervals of said information message signal, said configuration message defining the characteristics of the information message signal.

6. The apparatus recited in claim 5, wherein said configuration message comprises a plurality of bytes of information, each byte defining one of the characteristics of the information message signal, the order of the bytes being determined in accordance with a program stored in memory means of said control means.

7. The apparatus recited in claim 6, wherein the order of the bytes is randomly determined by said control means.

8. The apparatus recited in claim 6, wherein said memory means comprises plug in read-only-memory means.

9. The apparatus recited in claim 1, wherein said means for providing further comprises means for providing a coding format to said information message signal from amongst a plurality of coding formats, means for determining whether said information message signal is transmitted in half-duplex or full-duplex format, means for determining whether said information message signal is transmitted in asynchronous or synchronous format and means for determining the parity technique of said information message signal.

10. A method providing secure electronic communications between digital electronic data devices located at respective ends of a communication system comprising the steps of:
providing a plurality of characteristics to an information message signal containing an information message generated by one of the data devices for transmission to the other data device over a communications channel of the communication system, said plurality of characteristics comprising at least the baud rate of the information message signal selected from a plurality of baud rates, the modulation technique selected from a plurality of modulation techiques and the frequency of the carrier of the information message signal selected from a plurality of carrier frequencies;
automatically and randomly determining a configuration of the information message signal to be transmitted over the communications channel and generating a configuration message defining the configuration, thereby allowing the random selection of the characteristics of said information message signal, said configuration comprising a selection of at least one variation of each of said plurality of characteristics, said configuration message changing at random times thereby to change the configuration at said random times; and
selecting at least one variation of each of said plurality of characteristics in response to the configuration message and transmitting the information message signal configured in accordance with the configuration message to the other data device.

11. The method recited in claim 10, further comprising the step of changing the configuration of the information message signal to be transmitted at time intervals determined by a stored computer program.

12. The method recited in claim 11, wherein said step of changing comprises changing the configuration of the information message signal to be transmitted at random time intervals.

13. The method recited in claim 1, wherein said step of selecting comprises selecting the characteristics of the information message signal to be transmitted over the communications channel and transmitting said configuration message to the other end of the communications system over the communications channel for configuring apparatus at the other end of the system so as to enable reception of the information message signal.

14. The method recited in claim 13, wherein said configuration message comprises a message transmitted during intervals of said information message signal, said configuration message defining the characteristics of the information message signal.

15. The method recited in claim 14, wherein said configuration message comprises a plurality of bytes of information, each byte defining one of the characteristics of the information message signal, the order of the bytes being determined in accordance with a stored computer program.

16. The method recited in claim 15, wherein the order of the bytes is randomly determined.

17. The method recited in claim 15, wherein said stored computer program is disposed in read-only-memory means.

18. The method recited in claim 1, wherein said step of providing further comprises providing a coding format to said information message signal from amongst a plurality of coding formats, determining whether said information message signal is to be transmitted in half-duplex or full-duplex format, determining whether said information message signal is transmitted in asynchronous or synchronous format and determining the parity technique of said information message signal.

19. Apparatus preventing unauthorized access to a communications channel of a digital computer system comprising:
means for providing a plurality of characteristics to an information message signal containing an information message to be transmitted over the communications channel, said plurality of characteristics comprising at least the baud rate of the information message signal selected from a plurality of baud rates, the modulation technique selected from a plurality of modulation techniques and the frequency of the carrier of the information message signal selected from a plurality of carrier frequencies;
control means for automatically and randomly determining a configuration of the information message signal to be transmitted over the communications channel, thereby allowing the random selection of the characteristics of said information message signal, said configuration comprising a selection of at least one variation of each of said plurality of characteristics, said configuration being defined by a configuration message which changes at random times, thereby changing said configuration at the random times; and switching means coupled to said control means and to said means for providing for selecting at least one variation of each of said plurality of characteristics, said switching means being responsive to the configuration message defining said configuration generated by said control means.

20. The apparatus recited in claim 19 wherein said control means comprises microprocessor means for changing the configuration of the information message signal to be transmitted at time intervals determined by a program stored in memory means of said control means.

21. The apparatus recited in claim 20 wherein said microprocessor mean comprises means for changing the configuration of the information message signal to be transmitted at random time intervals.

22. The apparatus recited in claim 19 wherein said control means comprises means for generating said configuration message, and said switching means comprises means responsive to said configuration message for selecting the characteristics of the information message signal to be transmitted over the communications channel and for transmitting said configuration message to the other end of the computer system over the communications channel for configuring apparatus at the other end of the system so as to enable reception of the information message signal.

23. The apparatus recited in claim 22, wherein said configuration message comprises a messsage transmitted during intervals of said information message signal, said configuration message defining the characteristics of the information message signal.

24. The apparatus recited in claim 23, wherein said configuration message comprises of plurality of bytes of information, each defining one of the characteristics of the information message signal, the order of the bytes being determined in accordance with a program stored in memory means of said control means.

25. The apparatus recited in claim 24, wherein the order of the bytes is randomly determined by said control means.

26. The apparatus recited in claim 24, wherein said memory means comprises plug in read-only-memory means.

27. The apparatus recited in claim 19, wherein said means for providing further comprises means for providing a coded format to said information message signal from amongst a plurality of coding formats, means for determining whether said information message signal is transmitted in half-duplex or full-duplex format, means for determining whether said information message signal is transmitted in a synchronous or asynchronous format and means for determining the parity technique of said information message signal.

28. A method preventing unauthorized access to a communications channel of a digital computer system comprising the steps of:

providing a plurality of characteristics to an information message signal containing an information message for transmission over the communications channel, said plurality of characteristics comprising at least the baud rate of the information message signal selected from a plurality of baud rates, the modulation technique selected from a plurality of modulation techniques and the frequency of the carrier of the information message signal selected from a plurality of carrier frequencies;

automatically and randomly determining a configuration of the information message signal to be transmitted over the communications channel and generating a configuration message defining the configuration, thereby allowing the random selection of the characteristics of said information message signal, said configuration comprising a selection of at least one variation of each of said plurality of characteristics, said configuration message changing at random times thereby to change the configuration at said random times; and selecting at least one variation of each of said plurality of characteristics in response to the configuration message and transmitting the information message signal configured in accordance with the configuration message over the communications channel.

29. The method decided in claim 28, further comprising the step of changing the configuration of the information message signal to be transmitted at time intervals determined by a stored computer program.

30. The method recited in claim 29, wherein said step of changing comprises the configuration of the information message signal to be transmitted at random time intervals.

31. The method recited in claim 28, wherein said step of selecting comprises selecting the characteristics of the information message signal to be transmitted over the communications channel and transmitting said configuration message to the other end of the computer system over the communications channel for configuring apparatus at the other end of the system so as to enable reception of the information message signal.

32. The method recited in claim 31, wherein said configuration message comprises a message transmitted during intervals of said information message signal, said configuration message defining the characteristics of the information message signal.

33. The method recited in claim 32, wherein said configuration message comprises a plurality of bytes of information, each byte defining one of the characteristics of the information message signal, the order of the bytes being determined in accordance with a stored computer program.

34. The method recited in claim 33, wherein the order of the bytes is randomly determined.

35. The method recited in claim 33, wherein said stored computer program is disposed in read-only-memory means.

36. The method recited in claim 28, wherein said step of providing further comprises providing a coding format to said information message signal from amongst a plurality of coding formats, determining whether said information message signal is to be transmitted in half-duplex or full-duplex format, determining whether said information message signal is transmitted in a synchronous or asynchronous format and determining the parity technique of said information message signal.

* * * * *

UNITED STATES PATENT AND TRADEMARK OFFICE
CERTIFICATE OF CORRECTION

PATENT NO. : 4,763,357
DATED : Aug. 9, 1988
INVENTOR(S) : William S. Barr

It is certified that error appears in the above-identified patent and that said Letters Patent is hereby corrected as shown below:

Col. 10, line 8, after "host" insert --composite modem 20 must be able to respond to configuration--.

Col. 10, line 42, after "synchronized" insert --with the program contained in ROM 35 at the host end. Thus,--.

Col. 13, line 59, change "techiques" to --techniques--.

Col. 16, line 30, after "comprises" insert --changing--.

Signed and Sealed this

Twenty-fourth Day of January, 1989

Attest:

DONALD J. QUIGG

Attesting Officer     Commissioner of Patents and Trademarks